United States Patent
Park et al.

(10) Patent No.: US 7,658,515 B2
(45) Date of Patent: Feb. 9, 2010

(54) OPTICAL PACKAGE, OPTICAL LENS AND BACKLIGHT ASSEMBLY HAVING THE SAME

(75) Inventors: Se-Ki Park, Suwon-si (KR); Sang-Yu Lee, Yongin-si (KR); Gi-Cherl Kim, Yongin-si (KR); Seok-Hyun Nam, Seoul (KR)

(73) Assignee: Samsung Electronics, Co., Ltd, Suwon-Si (KR)

( * ) Notice: Subject to any disclaimer, the term of this patent is extended or adjusted under 35 U.S.C. 154(b) by 0 days.

(21) Appl. No.: 12/358,968

(22) Filed: Jan. 23, 2009

(65) Prior Publication Data

US 2009/0129063 A1 May 21, 2009

Related U.S. Application Data

(63) Continuation of application No. 11/239,869, filed on Sep. 30, 2005, now Pat. No. 7,488,089.

(30) Foreign Application Priority Data

Apr. 22, 2005 (KR) .............................. 2005-33520

(51) Int. Cl.
*F21V 5/00* (2006.01)
(52) U.S. Cl. .................. 362/311.02; 362/800; 362/326; 362/249.02
(58) Field of Classification Search ........... 362/217.15, 362/217.11, 249.01, 632–634
See application file for complete search history.

(56) References Cited

U.S. PATENT DOCUMENTS

| 6,097,549 | A | 8/2000 | Jenkins et al. |
|---|---|---|---|
| 7,159,997 | B2 | 1/2007 | Reo et al. |
| 7,182,481 | B2 | 2/2007 | Shimura |
| 2003/0189829 | A1 | 10/2003 | Shimizu et al. |
| 2005/0001537 | A1 | 1/2005 | West et al. |
| 2005/0201118 | A1* | 9/2005 | Godo .......................... 362/555 |
| 2006/0092644 | A1 | 5/2006 | Mok et al. |

FOREIGN PATENT DOCUMENTS

| CN | 1383498 A | 12/2002 |
|---|---|---|
| CN | 1519959 A | 8/2004 |
| CN | 1604346 A | 4/2005 |
| CN | 1797802 A | 7/2006 |
| JP | 06-349305 | 12/1994 |
| WO | WO03016963 | 2/2003 |

OTHER PUBLICATIONS

Examination Report, Samsung Electronics Co., Ltd., European Patent Application 06 002 317.3 dated May 14, 2008.

* cited by examiner

*Primary Examiner*—Laura Tso
(74) *Attorney, Agent, or Firm*—F. Chau & Associates, LLC.

(57) ABSTRACT

In an optical package capable of guiding light, and an optical lens and a backlight assembly having the optical package, the optical package includes a plurality of light emitting parts and a lens plate. The lens plate defines a plurality of lens parts corresponding to the light emitting parts, respectively. The lens plate has a plurality of light guiding portions extended from the lens parts in a side direction of the optical package.

9 Claims, 13 Drawing Sheets

FIG. 6
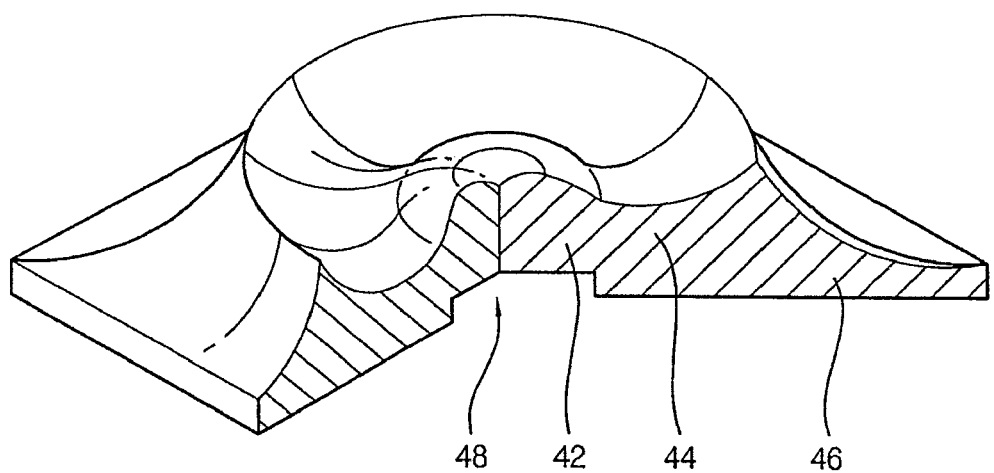
48  42  44  46
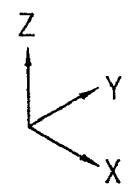

OPTICAL PACKAGE, OPTICAL LENS AND BACKLIGHT ASSEMBLY HAVING THE SAME

CROSS-REFERENCE TO RELATED APPLICATION

This application is a Continuation Application of U.S. patent application Ser. No. 11/239,869, filed Sep. 30, 2005, now U.S. Pat. No. 7,488,089 which claims benefit of Korean Patent No. 2005/33520, filed in the Korean Intellectual Property Office on Apr. 22, 2005, which are herein incorporated by reference in their entirety.

BACKGROUND OF THE INVENTION

1. Technical Field

The present disclosure relates to an optical package, an optical lens and a backlight assembly having the same. More particularly, the present disclosure relates to an optical package capable of guiding light, an optical lens and a backlight assembly having the same.

2. Discussion of the Related Art

A direct illumination type backlight unit (BLU) having a plurality of light emitting diodes (LEDs) includes a light guiding plate that diffuses light generated from the LEDs so that luminance of the direct illumination type BLU when viewed from a plane is uniform.

The light guiding plate includes polymethyl-methacrylate (PMMA) based resin. A refractivity index of the light guiding plate is about 1.5. The refractive index of the light guiding plate is greater than air so that a light incident into the light guiding plate is totally reflected from inner surfaces of the light guiding plate, thereby diffusing the light.

When a thickness of the BLU that is used for an LCD television receiver set or a monitor is decreased, a thickness of the light guiding plate is also decreased.

When the thickness of the light guiding plate is decreased, a mixing zone in which red, green and blue colors are mixed is decreased so that red, green and blue spots are displayed on the BLU, thereby decreasing the uniformity of the light generated from the BLU.

That is, when a thickness of the mixing zone is decreased, the red, green and blue spots that are caused by the LEDs are displayed on an LCD panel of the LCD device.

SUMMARY OF THE INVENTION

In accordance with embodiments of the present invention, there is provided an optical package capable of guiding light, an optical lens, a backlight assembly having the optical package, and a display device having the optical package.

An optical package in accordance with an embodiment of the present invention includes a plurality of light emitting parts and a lens plate. The lens plate defines a plurality of lens parts corresponding to the light emitting parts, respectively. The lens plate has a plurality of light guiding portions extended from the lens parts in a side direction of the optical package.

An optical package in accordance with another embodiment of the present invention includes a light emitting part and an optical lens. The optical lens includes a central lens portion, a peripheral lens portion and a light guiding portion. The central lens portion is positioned on the light emitting part, and has a convex shape. The peripheral lens portion is on an outside of the central lens portion to receive the central lens portion. The peripheral lens portion has a concave shape. The light guiding portion is extended from the peripheral lens portion.

An optical lens in accordance with an embodiment of the present invention includes a central lens portion, a peripheral lens portion and a light guiding portion. The central lens portion has a convex shape. The peripheral lens portion is on an outside of the central lens portion to receive the central lens portion. The peripheral lens portion has a concave shape. The light guiding portion is extended from the peripheral lens portion.

A backlight assembly in accordance with an embodiment of the present invention includes a base substrate and an optical package. The base substrate includes a first region and a second region surrounding the first region. The optical package is in the first region, and includes a plurality of light emitting parts and a plurality of optical lenses corresponding to the light emitting parts, respectively. Each of the optical lenses includes a central lens portion, a peripheral lens portion and a light guiding portion. The central lens portion has a convex shape. The peripheral lens portion is on an outside of the central lens portion to receive the central lens portion. The peripheral lens portion has a concave shape. The light guiding portion is extended from the peripheral lens portion.

A backlight assembly in accordance with another embodiment of the present invention includes a base substrate and an optical package. The base substrate includes a first region and a second region surrounding the first region. The optical package is in the first region. The optical package includes a plurality of light emitting parts and a lens plate. The lens plate defines a plurality of lens parts having convex shapes and corresponding to the light emitting parts, respectively. The lens plate is extended from the lens parts in a side direction of the optical package to have a concave shape.

A display device in accordance with an embodiment of the present invention includes a display panel and a backlight assembly. The display panel displays an image using light. The backlight assembly generates the light. The backlight assembly includes a base substrate, a plurality of light emitting parts and a plurality of optical lenses. The base substrate includes a first region and a second region surrounding the first region. The light emitting parts are in the first region. The optical lenses have a central lens portion, a peripheral lens portion and a light guiding portion. The central lens portion has a convex shape to cover each of the light emitting parts. The peripheral lens portion is on an outside of the central lens portion to receive the central lens portion. The peripheral lens portion has a concave shape. The light guiding portion is extended from the peripheral lens portion.

A display device in accordance with another embodiment of the present invention includes a display panel and a backlight assembly. The display panel displays an image using light. The backlight assembly generates the light. The backlight assembly includes a base substrate, a plurality of light emitting parts and a lens plate. The base substrate includes a first region and a second region surrounding the first region. The light emitting parts are in the first region. The lens plate defines a plurality of lens parts having convex shapes and corresponding to the light emitting parts, respectively. The lens plate is extended from the lens parts in a side direction of the optical package to have a concave shape.

According to the embodiments of the present invention, an optical lens guides light to uniformize light generated from LEDs.

BRIEF DESCRIPTION OF THE DRAWINGS

Preferred embodiments of the present invention can be understood in more detail from the following descriptions taken in conjunction with the accompanying drawings, in which:

FIG. 6 is a partially cutout perspective view showing an optical lens in accordance with an embodiment of the present invention;

DETAILED DESCRIPTION OF THE PREFERRED EMBODIMENTS

Preferred embodiments of the present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
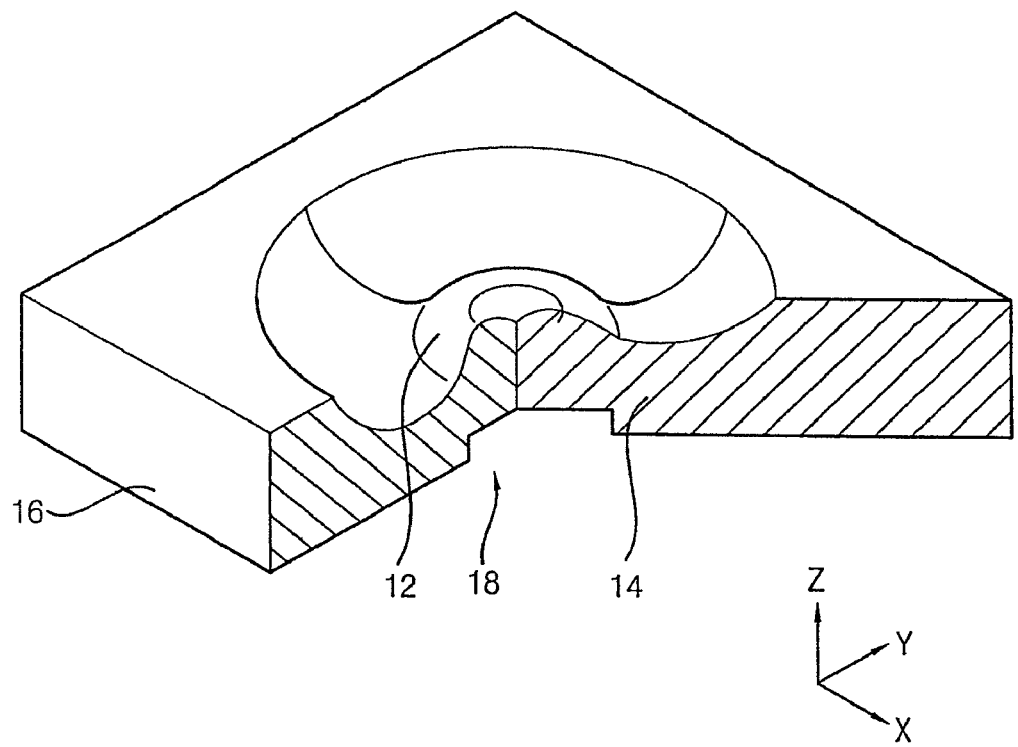
FIG. 1 is a partially cutout perspective view showing an optical lens in accordance with an embodiment of the present invention.
Figure 2:
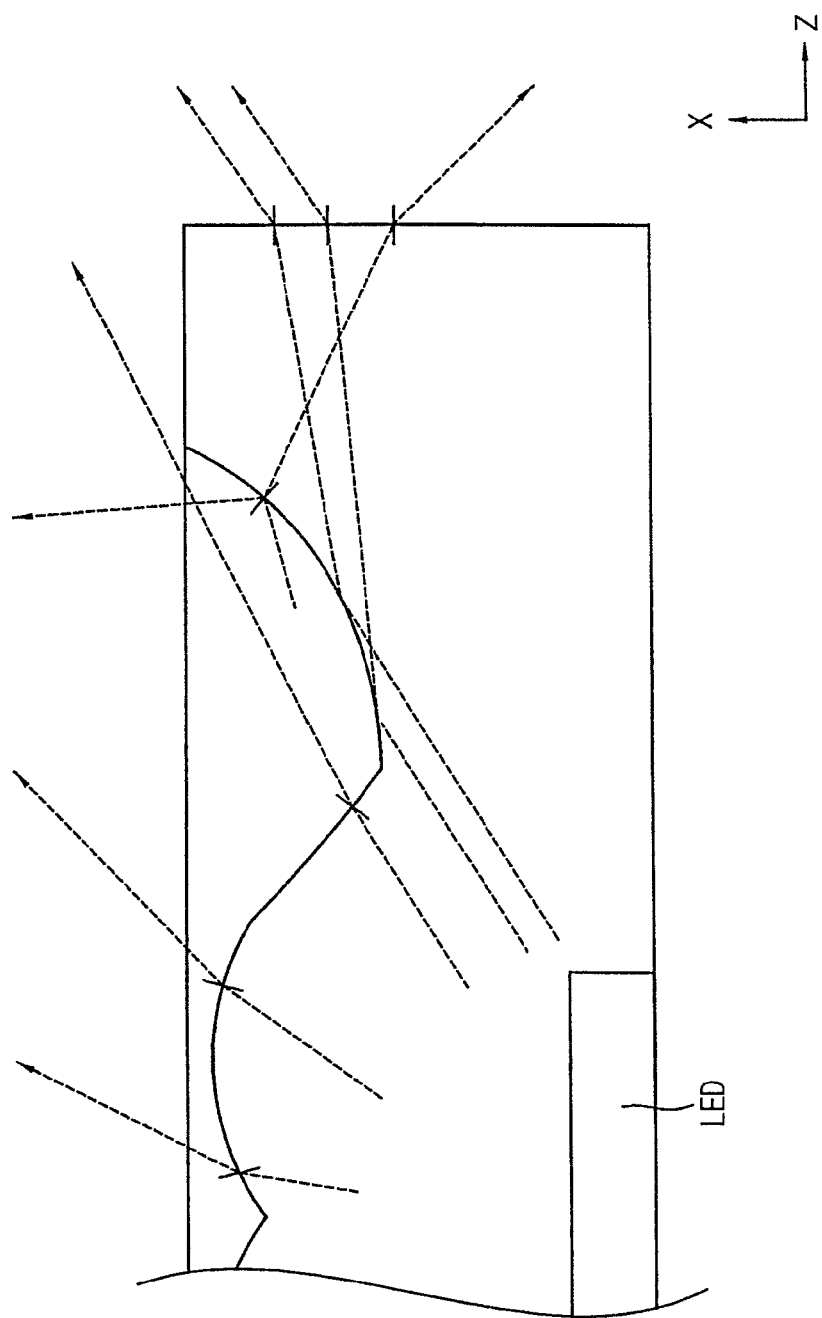
FIG. 2 is a cross-sectional view showing the optical lens shown in FIG. 1.

FIG. 1 is a partially cutout perspective view showing an optical lens in accordance with an embodiment of the present invention. FIG. 2 is a cross-sectional view showing the optical lens shown in FIG. 1. In FIGS. 1 and 2, a light guiding portion of the optical lens has uniform thickness. The light guiding portion functions as a plate. The light guiding portion guides light by a total internal reflection to uniformize luminance of the light.

Referring to FIGS. 1 and 2, the optical lens 10 includes a central lens portion 12, a peripheral lens portion 14 and a light guiding portion 16. A recess 18 for receiving a light emitting element is formed on a rear surface of the central lens portion 12. An example of the light emitting element is a light emitting diode (LED). The recess 18 for the light emitting element has a shape substantially same as the light emitting element.

The central lens portion 12 having a convex shape is protruded toward a front side of the optical lens 10 along a z-axis. The central lens portion 12 has a circular shape when viewed from an xy-plane. The central lens portion 12 is defined by curved surfaces having various curvatures. The convex shape of the central lens portion 12 results in the central lens portion functioning as a convex lens. Contour lines of the central lens portion 12 are substantially in parallel with one another. Alternatively, the contour lines of the central lens portion 12 may be concentrated toward a predetermined direction. That is, a portion of the contour lines of the central lens portion 12 may have greater density than a remaining portion of the contour lines of the central lens portion 12.

The peripheral lens portion 14 has a concave shape to receive the central lens portion 12. The peripheral lens portion 14 is adjacent to outer sides of the central lens portion 12. The concave shape of the peripheral lens portion 14 is recessed toward a rear side of the optical lens 10 along the z-axis. The peripheral lens portion 14 has a donut shape when viewed from the xy-plane. The peripheral lens portion 14 is defined by curved surfaces having various curvatures. The concave shape of the peripheral lens portion results in the peripheral lens portion functioning as a concave lens. Contour lines of the peripheral lens portion 14 are substantially in parallel with one another. Alternatively, the contour lines of the peripheral lens portion 14 may be concentrated toward a predetermined direction. That is, a portion of the contour lines of the peripheral lens portion 14 may have greater density than a remaining portion of the contour lines of the peripheral lens portion 14.

The light guiding portion 16 is extended from outer sides of the peripheral lens portion 14. The light guiding portion 16 has a flat plane that is substantially in parallel with the xy-plane. In FIG. 1, the light guiding portion 16 has a quadrangular shape. Alternatively, the light guiding portion 16 may have a donut shape, an elliptical shape, etc., that surrounds the peripheral lens portion 14.

Referring to FIG. 2, the light generated from the LED that is received in the recess 18 of the optical lens 10 is incident into the optical lens 10 so that light characteristics of the light are changed by the central lens portion 12, the peripheral lens portion 14 and the light guiding portion 16.

The light incident into the central lens portion 12 is refracted by the convex surface. An exit angle of the light exiting from the convex surface of the central lens portion 12 is greater than an incident angle of the light incident into the central lens portion 12. A relationship between the exit angle and the incident angle may be calculated using Snell's law. The optical lens 10 has a greater refractive index than air. The refractive indices of the optical lens 10 and the air are about 1.5 and about 1, respectively.

In FIG. 2, a reflection angle of the light reflected from an inner surface optical lens 10 is substantially equal to the incident angle of the light incident into the optical lens 10, and the reflected light is omitted.

The light incident into the peripheral lens portion 14 is refracted toward sides of the optical lens 10 by the concave surface. The refracted light that is incident into the peripheral lens portion 14 is again guided toward the sides of the optical lens 10 by the light guiding portion 16. That is, the peripheral lens portion 14 guides the light, and then the light guiding portion 16 guides the light after it is first guided by the peripheral lens portion 14.

Particularly, the concave surface of the peripheral lens portion 14 forms an angle of no more than about thirty degrees with respect to the LED. Therefore, a majority of the light that is incident into the inner surface of the peripheral lens portion 14 is reflected from the concave surface toward the light guiding portion 16. A portion of the light that is incident into an outer surface of the peripheral lens portion 14 is reflected from the concave surface toward the air, and a remaining portion of the light that is incident into the outer surface of the peripheral lens portion 14 is refracted and incident into the light guiding portion 16 through the peripheral lens portion 14 at a predetermined angle.

The light guiding portion 16 is extended from the peripheral lens portion 14 to guide the light from the peripheral lens portion 14 toward the sides of the optical lens 10 or the front surface of the optical lens 10. For example, the light that is reflected from the concave surface of the peripheral lens portion 14 is guided toward the front surface of the optical lens 10, and the light that has passed through the concave surface of the peripheral lens portion 14 is guided toward the rear surface of the optical lens 10.

The light that is reflected from the concave surface of the peripheral lens portion 14 is guided toward the front surface of the optical lens 10 to increase the luminance of a backlight unit (BLU) having the optical lens 10. The light that has passed through the concave surface of the peripheral lens portion 14 is guided toward the rear surface of the optical lens 10 to uniformize the luminance of the BLU.

Figure 3:
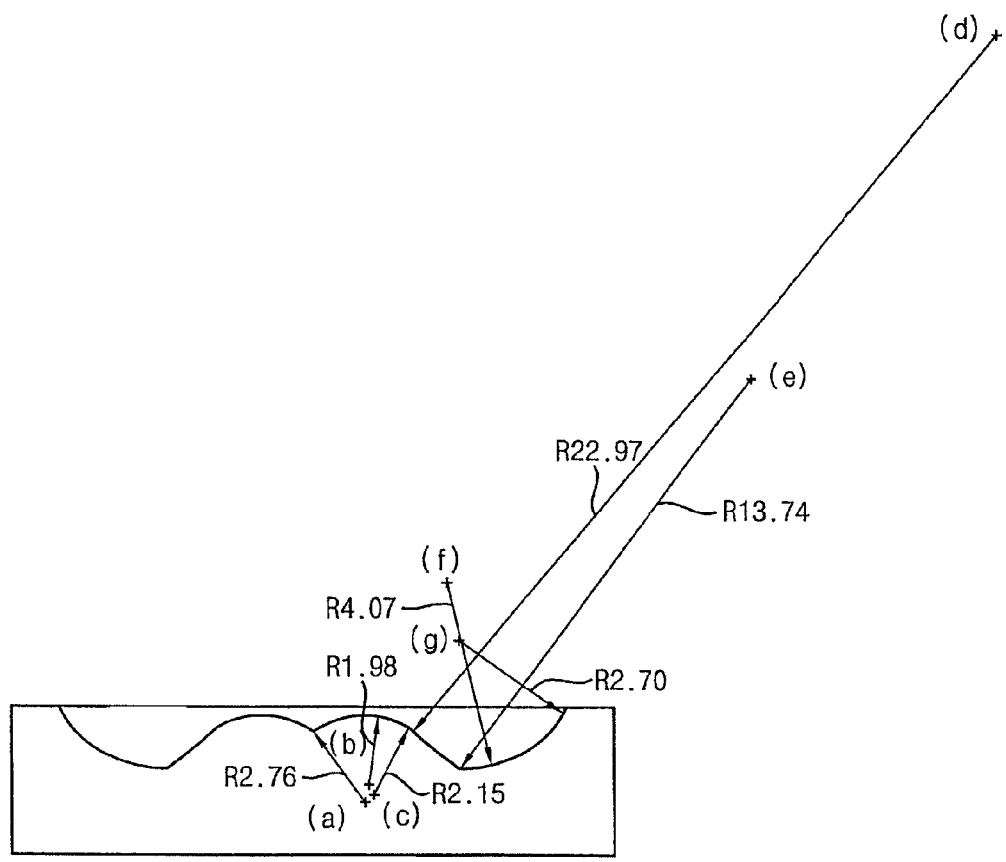
FIG. 3 is a cross-sectional view showing various curvatures of the optical lens shown in FIG. 1.

FIG. 3 is a cross-sectional view showing various curvatures of the optical lens shown in FIG. 1.

Referring to FIGS. 1 to 3, the central lens portion 12 has the convex surface including a recessed center. The convex surface including the recessed center of the central lens portion 12 is defined by various curvatures.

Particularly, the convex surface of the central lens portion 12 includes a first curved surface portion, a second curved surface portion, a third curved surface portion, a fourth curved surface portion and a fifth curved surface portion to form a convex cross-section. Referring to FIG. 3, the first curved surface portion is on a central portion of the convex surface, and has a first curvature with a radius of about 2.76 mm. A center of the first curvature is on a rear side of the convex surface of the central lens portion 12. The second curved surface portion is connected to the first curved surface portion, and has a second curvature with a radius of about 1.98 mm. A center of the second curvature is on the rear side of the convex surface of the central lens portion 12. The third curved surface portion is connected to the second curved surface portion, and has a third curvature with a radius of about 2.15 mm. A center of the third curvature is on the rear side of the convex surface of the central lens portion 12. The fourth curved surface portion is connected to the third curved surface portion, and has a fourth curvature with a radius of about 4.07 mm. A center of the fourth curvature is on a front side of the convex surface of the central lens portion 12. The fifth curved surface portion is connected to the fourth curved surface portion, and has a fifth curvature with a radius of about 22.97 mm. A center of the fifth curvature is on the front side of the convex surface of the central lens portion 12.

The peripheral lens portion 14 has the concave surface. The concave surface of the peripheral lens portion 14 includes a sixth curved surface portion and a seventh curved surface portion to form a concave cross-section. The sixth curved surface portion is connected to the fifth curved surface portion, and has a sixth curvature with a radius of about 13.74 mm. A center of the sixth curvature is on the front side of the convex surface of the peripheral lens portion 14. The seventh curved surface portion is connected to the sixth curved surface portion, and has a seventh curvature with a radius of about 2.70 mm. A center of the seventh curvature is on the front side of the convex surface of the peripheral lens portion 14.

In FIGS. 1 to 3, the central lens portion 12 has the convex surface including the recessed center. Alternatively, the central lens portion may have a convex surface that does not have any recessed center.

In FIGS. 1 to 3, the optical lens 10 has one recess 18 to receive one LED. Alternatively, the optical lens 10 may have a plurality of recesses 18 to receive a plurality of LEDs.

Figure 4:
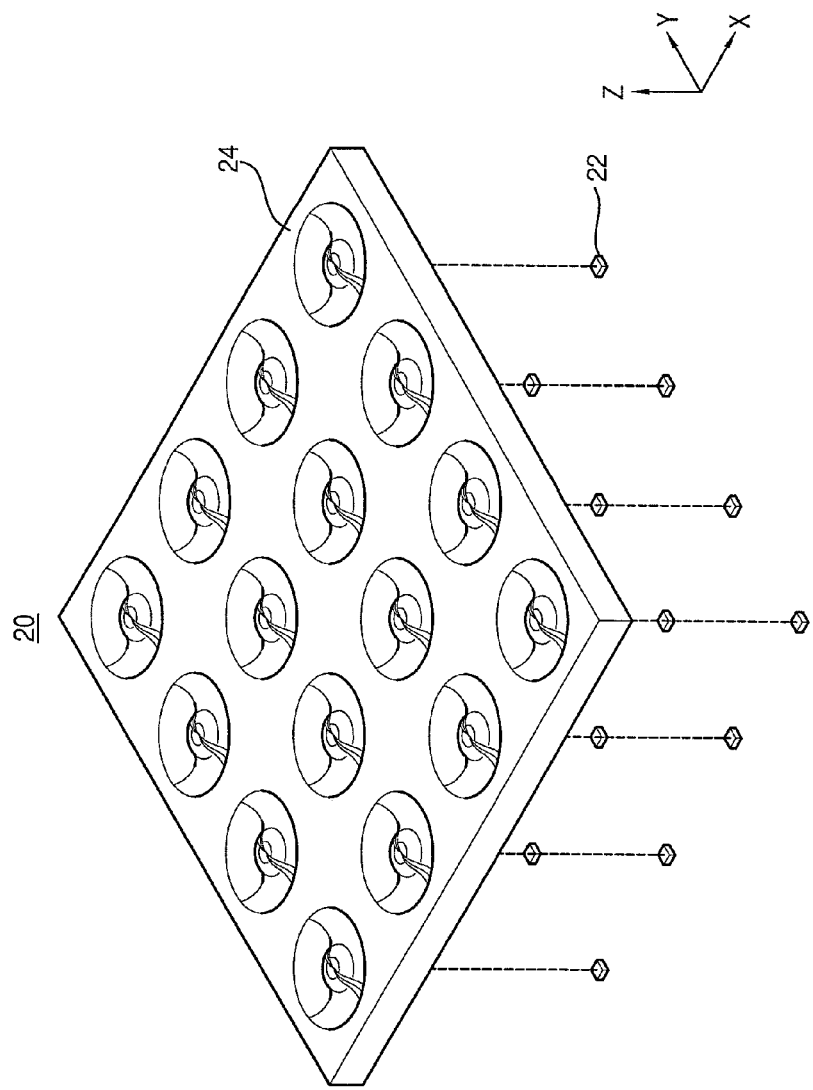
FIG. 4 is a perspective view showing an optical package in accordance with an embodiment of the present invention.

FIG. 4 is a perspective view showing an optical package in accordance with an embodiment of the present invention.

Referring to FIG. 4, the optical package 20 includes a plurality of LEDs 22 and a lens plate 24 to generate light having a uniform luminance.

The LEDs 22 are arranged on an xy-plane. In FIG. 4, sixteen LEDs 22 are arranged in a matrix shape.

The lens plate 24 includes a plurality of central lens portions, a plurality of peripheral lens portions and a plurality of light guiding portions. The lens plate 24 is positioned on the LEDs 22. Each of the LEDs 22 corresponds to each of the central lens portions, each of the peripheral lens portions and each of the light guiding portions. The lens plate 24 further includes a plurality of recesses to receive the LEDs 22. Each of the LEDs 22 is received in each of the recesses. The central lens portions, the peripheral lens portions and the light guiding portions of FIG. 4 are same as in FIGS. 1 to 3. Thus, any further explanation concerning the above elements will be omitted.

Figure 5:
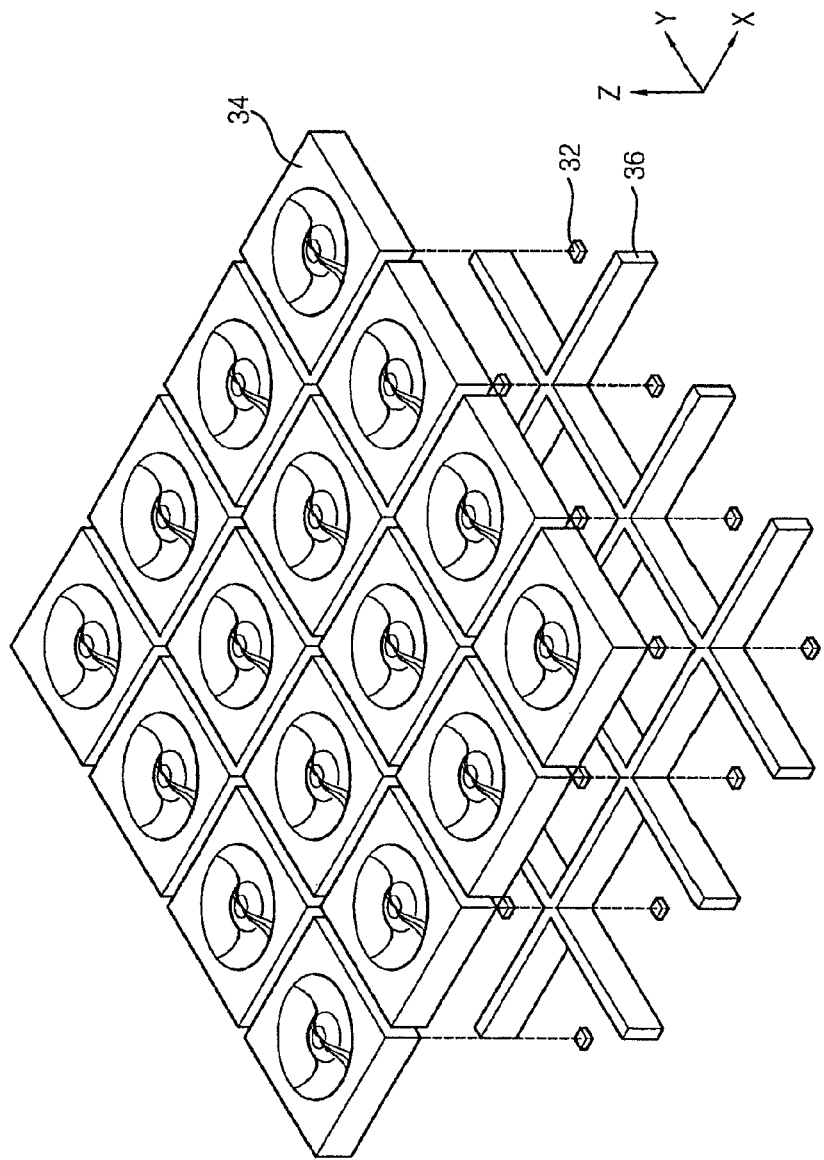
FIG. 5 is a perspective view showing an optical lens array in accordance with an embodiment of the present invention.

FIG. 5 is a perspective view showing an optical lens array in accordance with an embodiment of the present invention. In particular, a plurality of optical lenses are connected to each other by a connecting member.

Referring to FIG. 5, the optical package 30 includes a plurality of LEDs 32, a plurality of optical lenses 34 and a connecting member 36 to generate light having a uniform luminance.

The LEDs 32 are arranged on an xy-plane. In FIG. 5, sixteen LEDs 32 are arranged in a matrix shape.

Each of the optical lenses 34 includes a central lens portion, a peripheral lens portion and a light guiding portion. Each of the optical lenses 34 is positioned on each of the LEDs 32. Each of the optical lenses 34 of FIG. 5 is same as the optical lens 10 described in connection with FIGS. 1 to 3. Thus, any further explanation concerning the above elements will be omitted.

The connecting member 36 is between the optical lenses 34 so that air is not between adjacent optical lenses 34. The connecting member 36 may have substantially the same refractive index as the optical lenses 34. In FIG. 5, the optical lenses 34 include PMMA, and the connecting member 36 includes a silicone resin that has substantially the same refractive index as PMMA.

Light exiting from a light guiding portion of one of the optical lenses 34 is incident into a light guiding portion of an adjacent optical lens through the connecting member 36 having the silicone resin.

The optical lenses 34 are adjacent to each other, and the connecting member 36 is between the optical lenses 34 to seal the optical lenses 34 so that the connecting member 36 functions as a lens plate.

Figure 7:
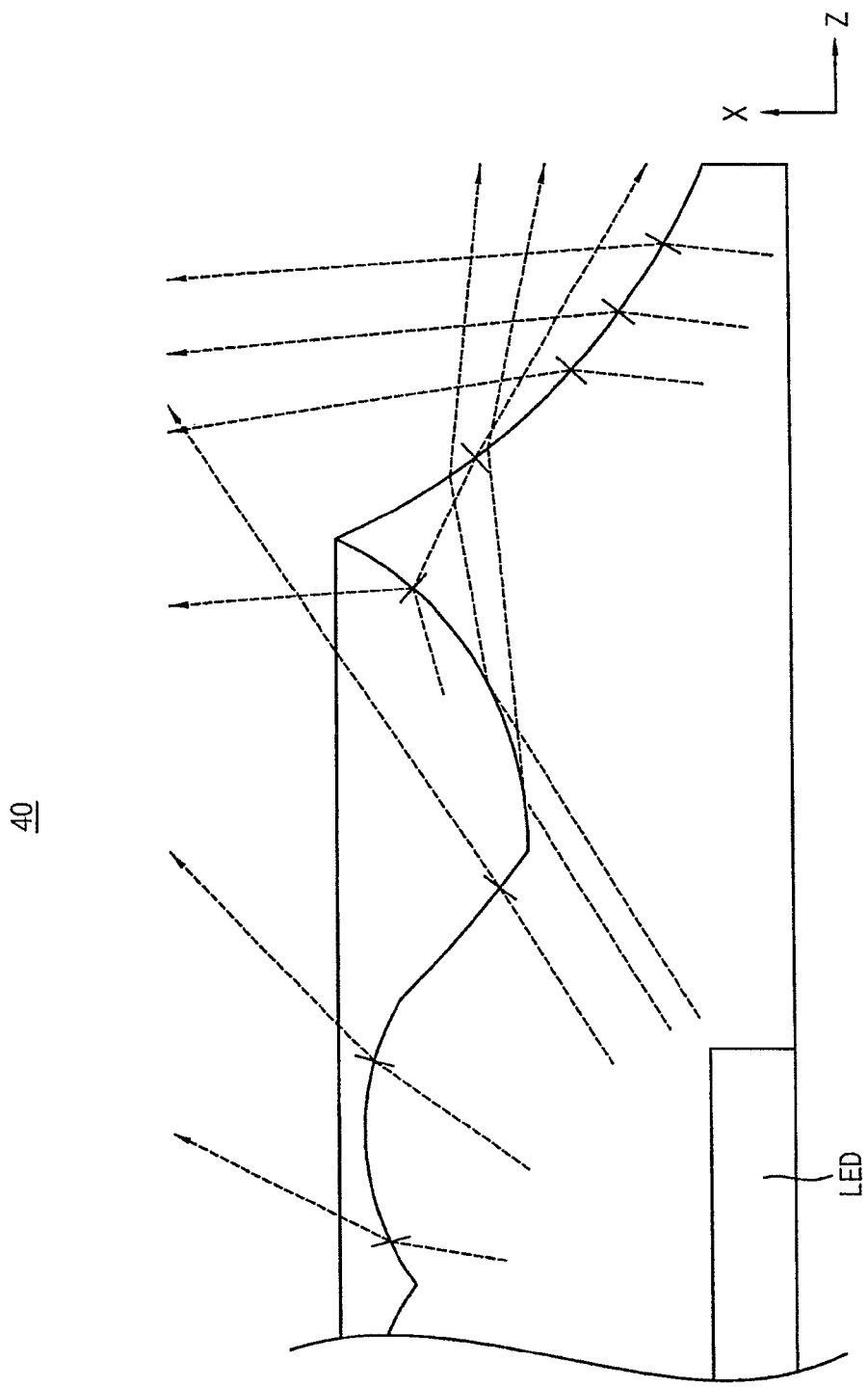
FIG. 7 is a cross-sectional view showing the optical lens shown in FIG. 6.

FIG. 6 is a partially cutout perspective view showing an optical lens in accordance with an embodiment of the present invention. FIG. 7 is a cross-sectional view showing the optical lens shown in FIG. 6. In particular, a light guiding portion of the optical lens has various thicknesses.

Referring to FIGS. 6 and 7, the optical lense 40 includes a central lens portion 42, a peripheral lens portion 44 and a light guiding portion 46.

A recess 48 for receiving a light emitting element is formed on a rear surface of the central lens portion 42. An example of the light emitting element is a light emitting diode (LED). The recess 48 for the light emitting element has a shape substantially the same as the light emitting element.

The central lens portion 42 has a convex shape protruded toward a front side of the optical lens 40 along the z-axis. The central lens portion 42 has a circular shape when viewed from a plane. The central lens portion 42 is defined by curved surfaces having various curvatures.

The peripheral lens portion 44 has a concave shape to receive the central lens portion 42. The peripheral lens portion 44 is adjacent to outer sides of the central lens portion 42. The concave shape of the peripheral lens portion 44 is recessed toward a rear side of the optical lens 40 along the z-axis. The peripheral lens portion 44 has a donut shape when viewed from the x-y plane. The peripheral lens portion 44 is defined by curved surfaces having various curvatures.

The light guiding portion 46 is extended from outer sides of the peripheral lens portion 44. A rear surface of the light guiding portion 46 has a flat plane that is substantially in parallel with the x-y plane, and a front surface of the light guiding portion 46 has a concave shape recessed toward the rear side of the optical lens 40 along the z-axis. A thickness of the light guiding portion 46 decreases as a distance from the center of the optical lens 40 is increased. The light guiding portion 46 may have an inclined linear cross-section, a curvilinear cross-section, etc. In FIG. 6, the light guiding portion 46 has a quadrangular shape. Alternatively, the light guiding portion 46 may have a donut shape, an elliptical shape, etc., that surrounds the peripheral lens portion 44.

Referring to FIG. 7, the light generated from the LED that is received in the recess 48 of the optical lens 40 is incident into the optical lens 40 so that light characteristics of the light are changed by the central lens portion 42, the peripheral lens portion 44 and the light guiding portion 46.

The light incident into the central lens portion 42 is refracted by the convex surface. An exit angle of the light exiting from the convex surface of the central lens portion 42 is greater than an incident angle of the light incident into the central lens portion 42. A relationship between the exit angle and the incident angle may be calculated using Snell's law. The optical lens 40 has a greater refractive index than air. The refractive indices of the optical lens 40 and the air are about 1.5 and about 1, respectively.

The light incident into the peripheral lens portion 44 is refracted toward sides of the optical lens 40 by the concave surface. The refracted light that is incident into the peripheral lens portion 44 is again guided toward the sides of the optical lens 40 by the light guiding portion 46. That is, the peripheral lens portion 44 guides the light, and then the light guiding portion 46 guides the light that was guided by the peripheral lens portion 44.

In particular, the concave surface of the peripheral lens portion 44 forms an angle of about five to ten degrees with respect to the LED. Therefore, a majority of the light that is incident into the inner surface of the peripheral lens portion 44 is reflected from the concave surface toward the light guiding portion 46. A portion of the light that is incident into an outer surface of the peripheral lens portion 44 is reflected from the concave surface toward the air, and a remaining portion of the light that is incident into the outer surface of the peripheral lens portion 44 is refracted and incident into the light guiding portion 46 through the peripheral lens portion 44 at a predetermined angle.

The light guiding portion 46 is extended from the peripheral lens portion 44 to guide the light from the peripheral lens portion 44 toward the sides of the optical lens 40 or the front surface of the optical lens 40. For example, an exit angle of the light that is incident into the light guiding portion 46 having the curvilinear cross-section of a predetermined curvature, is greater than an incident angle of the light that is incident into the light guiding portion 46, and the light exits from the sides of the optical lens 40.

Therefore, a portion of the light that exits from the front surface of the peripheral lens portion 44 increases the luminance of the BLU when viewed from a plane, and a remaining portion of the light exits from the sides of the optical lenses to uniformize the luminance of the BLU.

Figure 8:
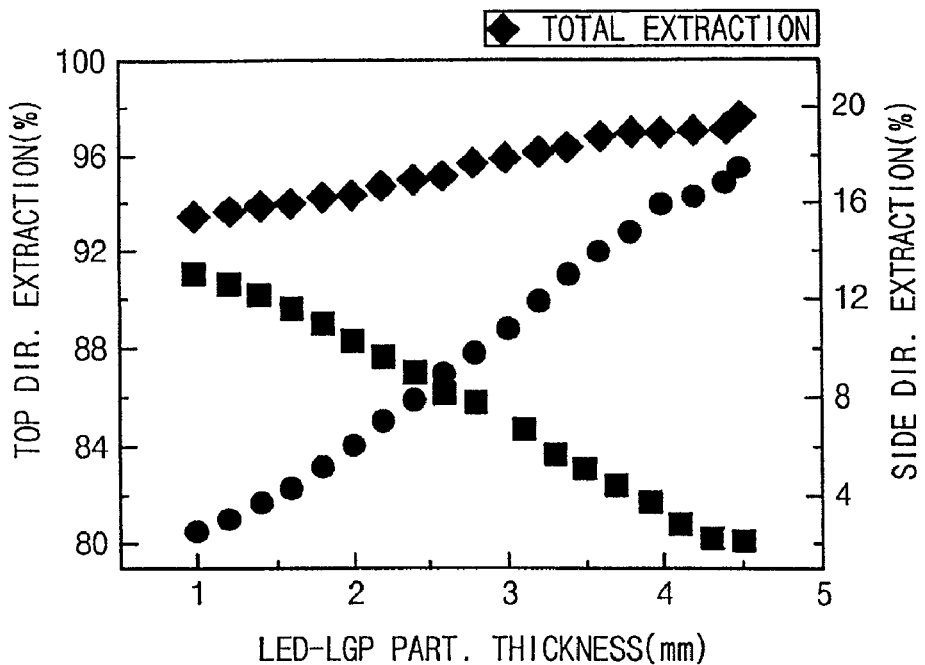
FIG. 8 is a graph showing a relationship between a thickness of a lens plate and an efficiency of light in a front direction and a side direction.

FIG. 8 is a graph showing a relationship between a thickness of a lens plate and an efficiency of light in a front direction and a side direction.

Referring to FIG. 8, an efficiency of the light in a side direction of the lens plate is increased as a thickness of a lens plate is increased. The side direction is from a center of an optical lens toward sides of the optical lens. In contrast, an efficiency of the light in a top direction of the lens plate is decreased as the thickness of the lens plate is increased. The top direction is from the center of the optical lens toward a front surface of the optical lens.

Particularly, when a thickness of the lens plate is about 1 mm, the efficiency of the light in the side direction is about 80%, and the efficiency of the light in the top direction is about 91%. When the thickness of the lens plate is about 2 mm, the efficiency of the light in the side direction is about 84%, and the efficiency of the light in the top direction is about 88%. When the thickness of the lens plate is about 3 mm, the efficiency of the light in the side direction is about 88%, and the efficiency of the light in the top direction is about 85%. When the thickness of the lens plate is about 4 mm, the efficiency of the light in the side direction is about 94%, and the efficiency of the light in the top direction is about 81%. When the thickness of the lens plate is about 4.4 mm, the efficiency of the light in the side direction is about 96%, and the efficiency of the light in the top direction is about 80%.

When the thickness of the lens plate is about 4.5 mm, a total efficiency of the light is about 97.67%.

About 80% of the light that is incident into the optical lens exits from a front surface of the optical lens, and about 18% of the light that is incident into the optical lens exits from a side surface of the optical lens. In particular, the light exiting from the side surface of the optical lens is incident into an adjacent optical lens so that the light is scattered, thereby improving a light uniformity.

Particularly, when the light guiding portion has a concave shape (or a bowl shape), the light that is incident into the optical lens is scattered in the side direction to improve the light uniformity.

Figure 9:
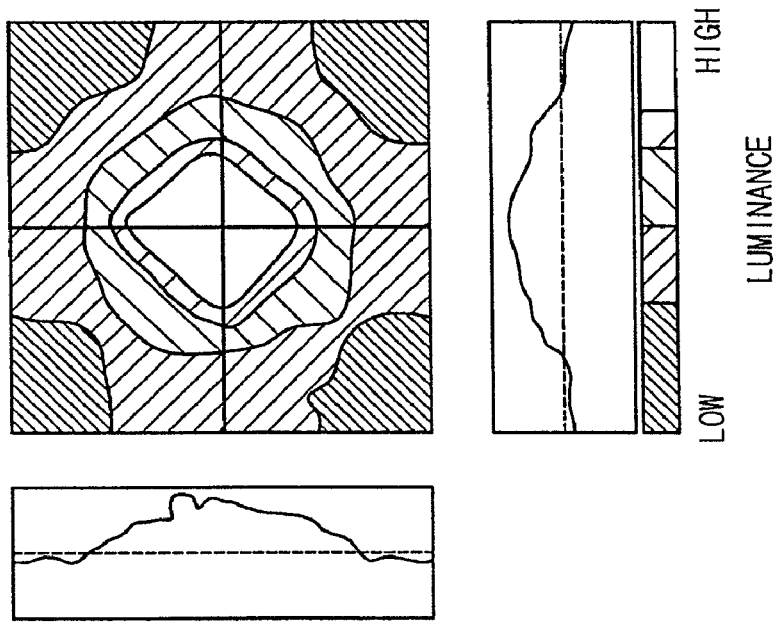
FIG. 9 is a graph showing a relationship between position and luminance of an optical lens in accordance with an embodiment of the present invention.
Figure 10A:
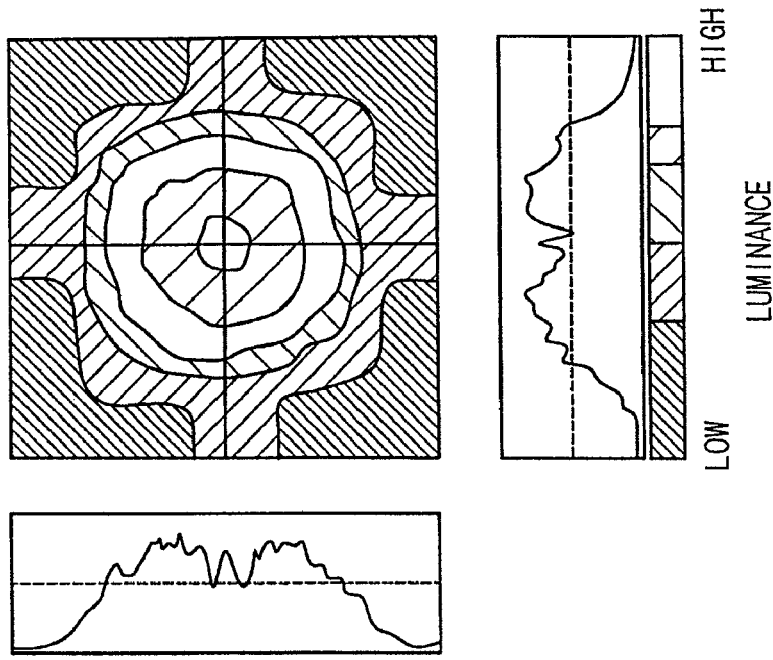
FIGS. 10A to 10E are graphs showing simulations of optical lens having various thickness.
Figure 10B:
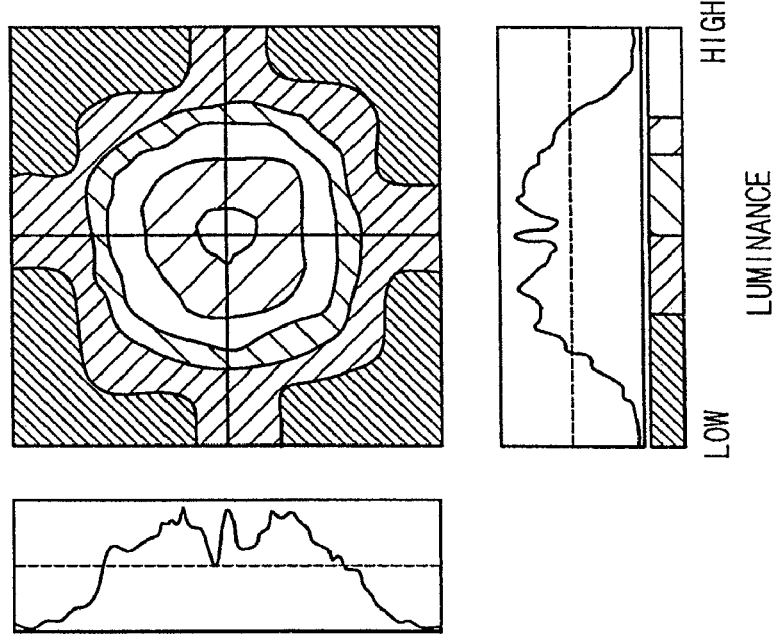
Figure 10C:
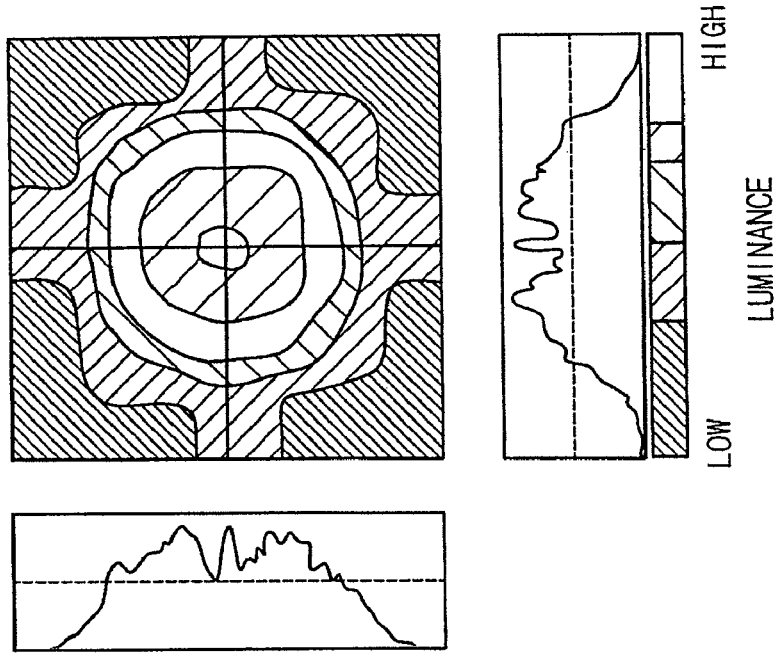
Figure 10D:
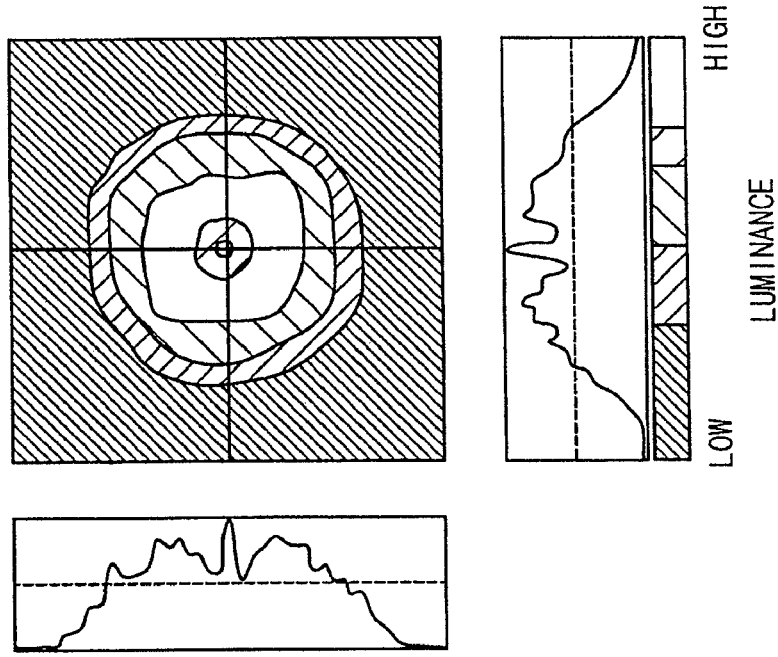
Figure 10E:
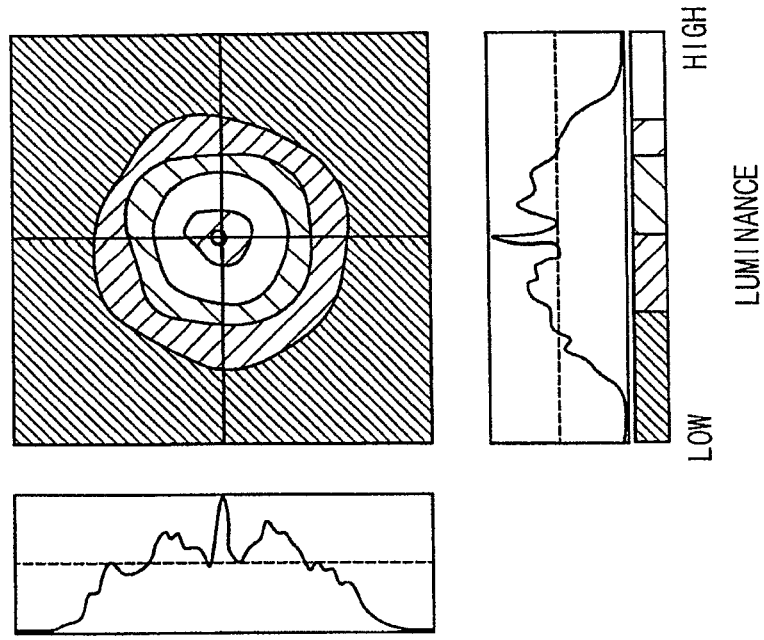

FIG. 9 is a graph showing a relationship between position and luminance of an optical lens in accordance with an embodiment of the present invention.

Referring to FIG. 9, a distribution of the luminance of the optical lens when viewed from a plane of the optical lens is illustrated by contour lines, and a distribution of the luminance of the optical lens when viewed from a side of the optical lens is illustrated in a cross-sectional view.

A center of the optical lens has greater luminance than a region adjacent to sides of the optical lens. The optical lens has a light guiding portion to decrease a difference of the luminances between the center of the optical lens and the region adjacent to the sides of the optical lens.

Hereinafter, a relationship between a thickness of an optical lens and a distribution of luminance is described.

FIGS. 10A to 10E are graphs showing simulations of optical lenses having various thicknesses. In particular, the thicknesses of the optical lenses in FIGS. 10A to 10E are about 3.7 mm, about 3.9 mm, about 4.1 mm, about 4.3 mm and about 4.5 mm, respectively.

Referring to FIGS. 10A to 10E, when the thickness of the optical lens is about 4.5 mm, an efficiency of the light is decreased so that uniformity of the luminance is decreased.

Figure 11:
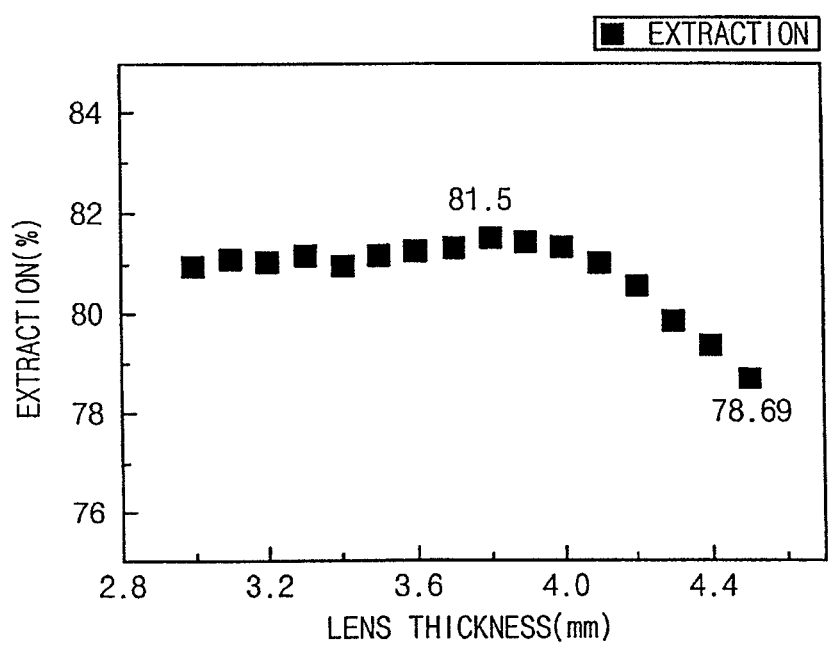
FIG. 11 is a graph showing a relationship between an efficiency of light and a thickness of an optical lens in accordance with an embodiment of the present invention.

FIG. 11 is a graph showing a relationship between an efficiency of light and a thickness of an optical lens in accordance with an embodiment of the present invention.

Referring to FIG. 11, when the thickness of the optical lens is about 4.4 mm, the efficiency of the light is about 78.69%. When the thickness of the optical lens is decreased, the efficiency of the light is increased, and a saturated value of the efficiency of the light is about 81%. That is, when the thickness of the optical lens is about 4.2 mm, the efficiency of the light is about 80.5%. When the thickness of the optical lens is about 4.0 mm, the efficiency of the light is about 81%. When the thickness of the optical lens is about 3.8 nm, the efficiency of the light is about 81.5%.

Figure 12:
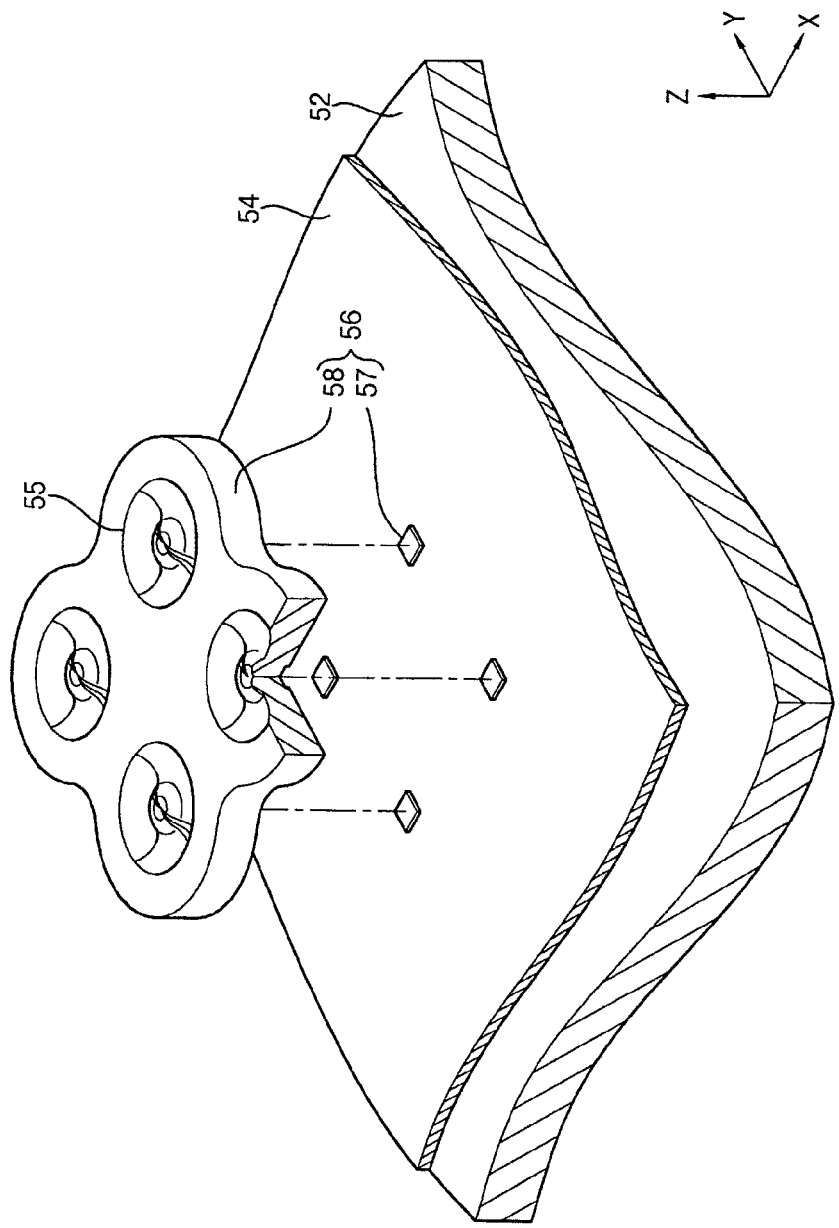
FIG. 12 is a partially cutout exploded perspective view showing a backlight assembly in accordance with an embodiment of the present invention.

FIG. 12 is a partially cutout exploded perspective view showing a backlight assembly in accordance with an embodiment of the present invention. Each of optical lenses of FIG. 12 is same as in FIG. 1. Thus, any further explanation concerning already described elements will be omitted.

Referring to FIG. 12, the backlight assembly 50 includes a base substrate 52, a reflecting plate 54 on the base substrate 52 and an optical package 56 on the reflecting plate 54.

The optical package 56 includes a light emitting part 57 and a lens plate 58 to generate a light having a uniform luminance.

The light emitting part 57 includes a plurality of point light sources. For example, the light emitting part 57 includes a plurality of light emitting diodes (LEDs). The light emitting part 57 may include a plurality of white LEDs. Alternatively, the light emitting part 57 may include a plurality of red LEDs, a plurality of green LEDs and a plurality of blue LEDs. In particular, the light emitting part 57 may include one red LED, two green LEDs and one blue LED.

Central portions of the lens plate 58 have a plurality of convex shapes including recessed centers to define a plurality of lens parts 55 that are extended in a side direction of the backlight assembly 50. The central portions of the lens plate 58 are positioned over the LEDs of the light emitting part 57, respectively.

In FIG. 12, the lens plate 58 surrounds the lens parts 55 having a circular shape. Alternatively, the lens plate 58 may have a quadrangular shape, a pentagonal shape, etc.

In addition, the lens plate has a uniform thickness. Alternatively, a thickness of the lens plate adjacent to the central portions may be greater than a thickness of the lens plate spaced apart from the central portions.

Furthermore, the LEDs are spaced apart from each other by a constant distance. Alternatively, the LEDs may be randomly scattered so that the central portions of the lens plate 58 are randomly scattered.

Figure 13:
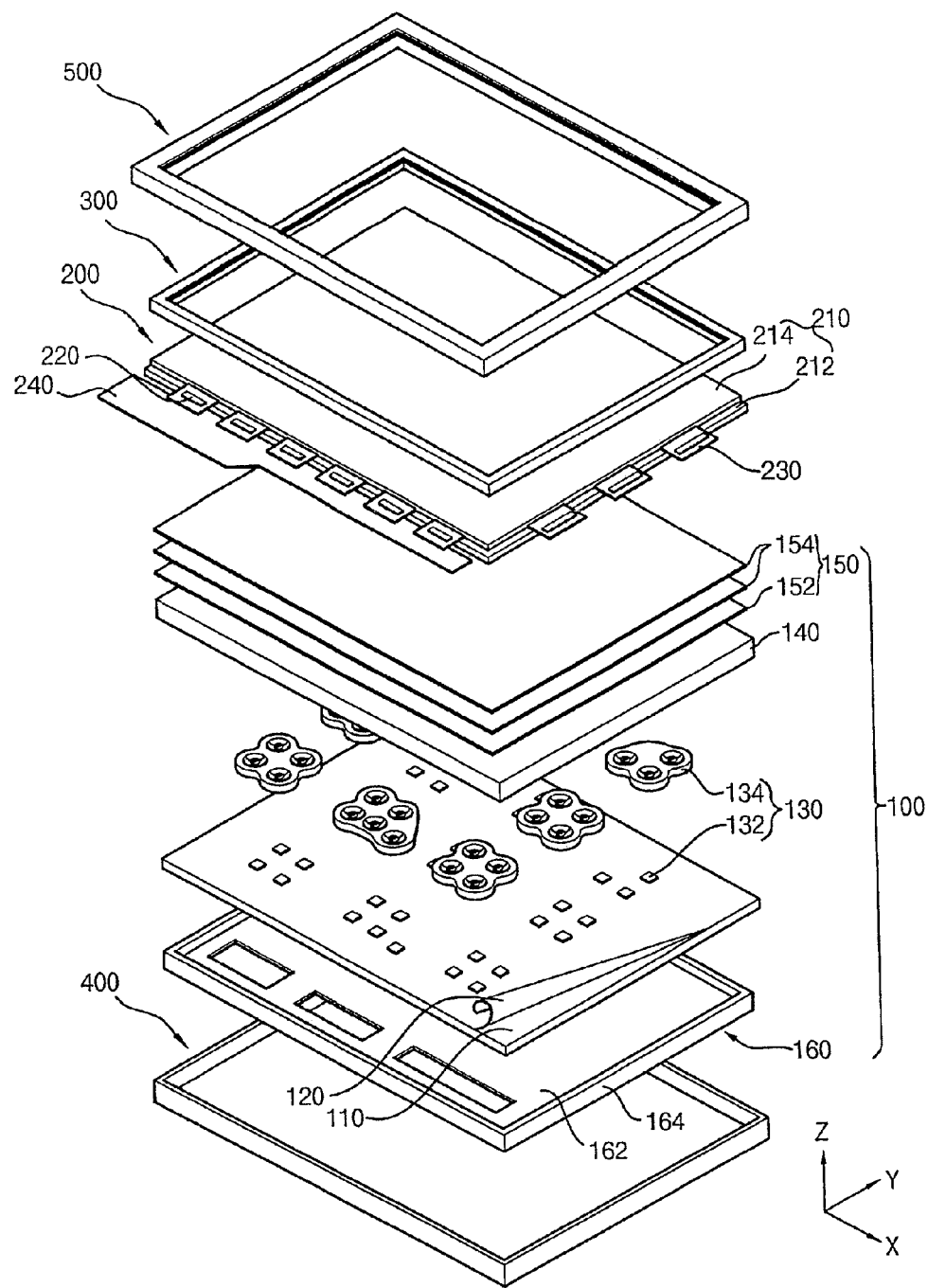
FIG. 13 is an exploded perspective view showing a liquid crystal display (LCD) device in accordance with an embodiment of the present invention.

FIG. 13 is an exploded perspective view showing a liquid crystal display (LCD) device in accordance with an embodiment of the present invention.

Referring to FIG. 13, the LCD device includes a backlight assembly 100, a display assembly 200, a top chassis 300, a rear case 400 and a front case 500.

The backlight assembly 100 includes a base substrate 110, a reflecting sheet 120, a plurality of optical packages 130, a light mixing member 140, optical sheets 150 and a receiving container 160.

The base substrate 110 includes a plurality of conductive lines so that a voltage is applied to the optical packages 130.

The reflecting sheet 120 is between the base substrate 110 and the optical packages 130 to prevent a leakage of the light from the optical packages 130. That is, a portion of the light from the optical packages 130 is reflected from the reflecting sheet 120 toward the light mixing member 140. Alternatively, a material having high reflectivity may be directly coated on the base substrate 110 to form a reflecting sheet.

Each of the optical packages 130 includes a light emitting part 132 and a lens plate 134 to generate a light having uniform luminance. The optical packages 130 are positioned on the base substrate 110. The optical packages 130 may generate a white light. Alternatively, the optical packages 130 may generate a red light, a green light, a blue light or a mixture thereof.

The light mixing member 140 is positioned on the optical packages 130. The light from the optical packages 130 is reflected from inner surfaces of the light mixing member 140 or passes through the light mixing member 140 so that the light is mixed in the light mixing member 140. In FIG. 13, the red, green and blue lights are mixed to form a white light.

The optical sheets 150 include a diffusion plate 152 and a prism sheet 154. The diffusion plate 152 diffuses the light that has passed through the light mixing member 140. The prism sheet 154 increases luminance of the light that has passed through the diffusion plate 152 when viewed from a plane of the backlight assembly 100.

The receiving container 160 includes a bottom plate 162 and a plurality of sidewalls 164 protruded from sides of the bottom plate 162. The bottom plate 162 may be partially opened. The base substrate 110, the reflecting sheet 120, the optical package 130, the light mixing member 140 and the optical sheets 150 are received in the receiving container 160, in sequence.

The display assembly 200 includes a liquid crystal display (LCD) panel 210, a plurality of data tape carrier packages (TCPs) 220, a plurality of gate TCPs 230 and an integrated printed circuit board (PCB) 240. An image is displayed on the LCD panel 210.

The LCD panel 210 includes an array substrate 212, a color filter substrate 214 and a liquid crystal layer (not shown). The array substrate 212 includes a plurality of pixels. The color filter substrate 214 corresponds to the array substrate 212. The liquid crystal layer (not shown) is interposed between the array substrate 212 and the color filter substrate 214.

The data TCPs 220 are on a source side of the array substrate 212, and the gate TCPs 230 are on a gate side of the array substrate 212. The data TCP 220 applies driving signals to the LCD panel 210 to drive the LCD panel 210. The gate TCP 230 applies control signals and timing signals to the LCD panel 210 to control the driving signals.

A portion of the data TCP 220 is attached to the array substrate 212, and another portion of the data TCP 220 is attached to the integrated PCB 240 so that the LCD panel 210 is electrically connected to the integrated PCB 240. The gate TCP 230 is attached to the array substrate 212 to electrically connect the LCD panel 210 to the integrated PCB 240. The integrated PCB 240 receives electric signals that are provided from an outside of the integrated PCB 240 to apply the electric signals to the data and gate TCPs 220 and 230.

The data and gate TCPs 220 and 230 are backwardly bent along an outer surface of the sidewalls 164 of the receiving container 160 so that the integrated PCB 240 is on a rear surface of the bottom plate 162.

The top chassis 300 is positioned on the LCD panel 210. The top chassis 300 partially covers the LCD panel 210 so that an effective display region of the LCD panel 210 is exposed through an opening of the top chassis 300. The top chassis 300 is combined with the receiving container 160 to fix the display unit to the backlight assembly 100.

The backlight assembly 100, the display assembly 200 and the top chassis 300 are received in the rear case 400. The rear case 400 is combined with the front case 500 that is on the top chassis 300. Therefore, the LCD device is completed.

According to the present invention, an optical lens includes a lens portion emitting a portion of light generated from a light source in a front direction, a curved portion guiding another portion of the light, and a lens plate portion guiding and transmitting a remaining portion of the light to uniformize luminance of the light.

In addition, the optical lens guides the light generated from the light source so that the light may be easily mixed to generate a white light although the light source generates a red light, a green light and a blue light. Therefore, red, green and blue spots on the light source may be prevented although a thickness of a mixing zone is decreased, thereby improving uniformity of the luminance.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
   a light source; and
   an optical plate comprising:
   a lens portion having a recess to receive the light source; and
   a light guiding portion being extended from outer sides of the lens portion, the light guiding portion guiding light emitted from the light source, wherein an efficiency of a light in a side direction of the optical plate is increased as a thickness of the optical plate is increased, and an efficiency of the light in a top direction of the optical plate is decreased as the thickness of the optical plate is increased.

2. The backlight assembly of claim 1, wherein a first light amount exited through a front surface of the optical plate is substantially greater than a second light amount exited through a side surface of the optical plate.

3. The backlight assembly of claim 2, wherein the first light amount is greater than the second light amount by about four times.

4. The backlight assembly of claim 1, wherein the recess has a shape substantially the same as the light source.

5. The backlight assembly of claim 4, wherein the light source is a light emitting diode (LED).

6. The backlight assembly of claim 1, wherein the recess is formed on a rear surface of the optical plate corresponding to the light source.

7. The backlight assembly of claim 1, wherein the lens portion comprises:
   a central lens portion; and
   a peripheral lens portion being adjacent to an outer side of the central lens portion.

8. The backlight assembly of claim 7, wherein the central lens portion has a convex shape protruded toward a front side of the optical plate.

9. The backlight assembly of claim 1, wherein increase of the efficiency of the light in the side direction is about 4% and increase of the efficiency of the light in the top direction is about 3% as a thickness of the lens portion is increased about 1 mm.

* * * * *